United States Patent
Gupta et al.

(10) Patent No.: US 10,993,148 B2
(45) Date of Patent: Apr. 27, 2021

(54) SYSTEMS AND METHODS FOR PERFORMING A HANDOVER IN HETEROGENEOUS NETWORKS

(71) Applicant: RELIANCE JIO INFOCOMM LIMITED, Maharashtra (IN)

(72) Inventors: Ajay Kumar Gupta, Maharashtra (IN); Vishal Vasant Oak, Karnataka (IN)

(73) Assignee: RELIANCE JIO INFOCOMM LIMITED, Maharashtra (IN)

( * ) Notice: Subject to any disclaimer, the term of this patent is extended or adjusted under 35 U.S.C. 154(b) by 450 days.

(21) Appl. No.: 15/999,063

(22) PCT Filed: Feb. 16, 2017

(86) PCT No.: PCT/IB2017/050863
§ 371 (c)(1),
(2) Date: Aug. 17, 2018

(87) PCT Pub. No.: WO2017/141179
PCT Pub. Date: Aug. 24, 2017

(65) Prior Publication Data
US 2021/0029592 A1    Jan. 28, 2021

(30) Foreign Application Priority Data
Feb. 18, 2016 (IN) .............................. 201621005689

(51) Int. Cl.
*H04W 36/00* (2009.01)
*H04B 17/318* (2015.01)
(52) U.S. Cl.
CPC ...... *H04W 36/0022* (2013.01); *H04B 17/318* (2015.01); *H04W 36/0058* (2018.08); *H04W 36/0061* (2013.01)

(58) Field of Classification Search
CPC ......... H04W 36/0022; H04W 36/0058; H04W 36/0061; H04B 17/318
See application file for complete search history.

(56) References Cited

U.S. PATENT DOCUMENTS

| 7,929,970 | B1 | 4/2011 | Gunasekara et al. |
| 2010/0167744 | A1 | 7/2010 | Alcatel-Lucent |
| 2016/0302122 | A1* | 10/2016 | Masini ............... H04W 84/045 |

FOREIGN PATENT DOCUMENTS

| EP | 2453700 | 5/2012 | |
| WO | 2011022731 | 2/2011 | |
| WO | WO-2013120274 A1 * | 8/2013 | ........ H04W 36/0055 |

OTHER PUBLICATIONS

PCT International Search Report, International Application No. PCT/IB2017/050863, dated May 8, 2017, pp. 1-2.

* cited by examiner

*Primary Examiner* — Brian P Cox
(74) *Attorney, Agent, or Firm* — Hunton Andrews Kurth LLP (57) ABSTRACT

Embodiments of the present disclosure relate to performing a handover on a user equipment [140] from a serving base station [110] to a target base station. In one embodiment, a method is disclosed, comprising: receiving a handover report from the user equipment [140]; identifying at least one access point [130A, 130B]; transmitting a request message to at least one of the at least one access point [130A, 130B] and a network entity; receiving the response messages from at least one of the at least one access point [130A, 130B] and the network entity; and processing at least one of the first response message and the second response message for performing the handover from the serving base station [110] to one of the neighbouring target base stations [120A, 120B].

16 Claims, 9 Drawing Sheets

SYSTEMS AND METHODS FOR PERFORMING A HANDOVER IN HETEROGENEOUS NETWORKS

This application is a National Stage Application of PCT Application No. PCT/IL2017/050863, filed Feb. 16, 2017, which claims priority to Indian Patent Application No. 201621005689, filed Feb. 18, 2016 and is entitled "SYSTEMS AND METHODS FOR PERFORMING A HANDOVER IN HETEROGENEOUS NETWORKS". The disclosures of each of these documents is hereby incorporated by reference in its entirety.

TECHNICAL FIELD

The present disclosure generally relates to communication systems and is more specifically directed to a Wi-Fi assisted handover event in heterogeneous networks.

BACKGROUND

Presently, in an outgoing cellular deployment, suitable powered macro cells are being deployed in order to cover large areas. However, the deployment of such macro cells does not manage to abate quick capacity degradation as the number of user equipment (UE) operating in the macro cells coverage areas increases. To this end, the cellular operators are now reinforcing the macro cells deployment along with one or multiple low-powered small cellular cells (termed as Femto/Pico/Microcells) placed at multiple strategic locations within one or more macro coverage areas and such an arrangement of the macro cells along with the small cellular cells is termed as a Heterogeneous Network or HetNet.

In a typical HetNet, the strategic locations for small cells generally include areas with high density of users, such as shopping malls, airports, railway/bus stations, colleges, etc. Also, these locations might include an area with dead-spots, or areas with low macro cell signal strengths, such as indoor establishments or peripheral locations of the macro cell coverage area. The placement of the small cellular cells along with macro cells at multiple strategic locations as described above, results in HetNets that not only provide an increased mobile data capacity but also provides better mobile coverage, thereby enhancing the overall mobile broadband experience of the user.

In recent years, technologies such as Wi-Fi based on IEEE 802.11 standards have also undergone tremendous growth and commercialization. In current market scenario, nearly all available UE with cellular capability support are being integrated by default with Wi-Fi capability in order to connect with available Wi-Fi networks operating in the unlicensed frequency bands such as 2.4 GHz, or 5 GHz. Therefore, with technological enhancement, the cellular operators use universal and cost-effective Wi-Fi technology in pursuing the HetNet deployment and implementation strategy. Also, many operators are now deploying low-powered Wi-Fi cells along with cellular small cells at multiple strategic locations identified for the HetNet. Further, for ease of maintenance and provision, a few operators are also using Wi-Fi integrated versions of small cellular cells, wherein the Wi-Fi and the cellular small cell technology are made available on common equipment.

An exemplary case of a typical HetNet comprises a macro base station for providing wide area coverage to service users. Within the macro cell coverage, several low power nodes are employed in service areas having a higher density of users requiring high data rates. Examples of such low power nodes comprise a first microcell and a second microcell where the first microcell and the second microcell integrated with Wi-Fi radio are widely used to provide multi-technology hotspot capacity/coverage goals. Alternatively, the operators could deploy sovereign and cost-effective Wi-Fi access points in hotspot areas to offload the cellular load to meet the capacity/coverage requirements of the users. In the HetNet, the macro base station coverage could be used for wide area overlay mobility coverage while the micro base stations along with coverage of the Wi-Fi access points could be used for upgrading the mobile capacity.

In a typical cellular deployment, where a UE is clamped to a serving base station in a radio resource control (RRC) connected state, the handover from the serving base station to another base station is network based. The handover is therefore, executed based on certain cellular events reported by the UE to the serving base station along with the evaluation of such events by the serving base station. These cellular events are based on cellular measurements that are performed by the UE on the serving base station and one or more neighbouring base stations present in the vicinity of the UE.

In an exemplary case of handover (A3 event), in an event the signal strength reference signal received power (RSRP)/reference signal received quality (RSRQ) of the neighbouring base station is observed better than the corresponding signal strength (RSRP/RSRQ) of the serving station by a pre-configured offset, the UE carries out the cellular measurements and triggers a handover.

Similarly, a handover is performed from a macro base station to a micro/pico base station located in a hotspot coverage that is within a macro coverage area. However, there could be a possibility of hotspot area/s within the macro coverage area where the signal strength of the macro base station continues to be high as compared to signal strength of the relatively low powered micro/pico base stations deployed in the hotspot area/s. In such events, the UE in these hotspot area/s will only detect the signal strength of these micro/pico base station and will not observe the signal strength of micro/pico base station/s going above the signal strength of the corresponding macro base station so as to allow the handover based on traditional handover event triggers. For instance, if the RSRP of the small cell (micro/pico cell) does not exceed RSRP of the macro cell in former's coverage area, the UE in an RRC connected state with macro station and located in the corresponding small cell coverage area will not be handed over by macro station to the small cell based on traditional event based handover triggers.

Further, there exist several known solutions to overcome the limitations occurred in performing the handover in the heterogeneous network. In one of the solutions for performing the handover, the macro base station detects and advertises an appropriately adjusted cell individual offset (CIO) of the corresponding micro/pico base station to the UE, thereby allowing the UE to send a handover trigger report to the macro base station even when the macro base station signal strength outweighs the signal strength of neighbouring micro/pico base station at the UE location. However, the self-organizing network (SON) procedures such as mobility load balancing (MLB) are required to interwork between a macro base station and multiple micro/pico base stations in order to iteratively adjust the initial configured CIO value to a more optimal one and are further used to adjust the CIO values for optimal handover from macro base station to micro/pico base station. This results in slower processing that usually runs with a long periodic time interval. Also, the CIO values of multiple micro/pico base stations need to be sent to the UE irrespective of a position of the UE with respect to a hotspot area with micro/picocell coverage. This results in huge overhead in the event of a large number of micro/pico base stations operating at various hotspot locations in the macro coverage area.

Accordingly, existing technologies do not solve the problems related to performing handover procedures in the HetNet deployment so as to offload the cellular load to meet the capacity/coverage requirements of the users.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a serving base station implemented in a heterogeneous network for performing a handover, the serving base station comprising a communication module configured to receive a handover report from at least one user equipment, wherein the handover report comprises at least one network parameter, and the at least one network parameter comprises a basic service set identifier; identify at least one access point based on the basic service set identifier; transmit a request message to at least one of the at least one access point and the at least one network entity; receive at least one of a first response message from the at least one access point and a second response message from the at least one network entity, wherein the first response message comprises a first neighbour list including a first target base station within the coverage of the at least one access point, the second response message comprises a second neighbour list including a second target base station within the coverage of the at least one access point, and the first response message and the second response message comprising at least one of a station load and a Wi-Fi overlapping quantum of the first target base station and the second target base station; and a processing module configured to process at least one of the first response message and the second response message for performing the handover from the serving base station to a target base station, wherein the target base station is one of the first target base station and the second target base station.

Further, the embodiments of the present disclosure encompass a method for performing a handover in a heterogeneous network, the method being performed by a serving base station, the method comprising steps of receiving a handover report from at least one user equipment, wherein the handover report comprises at least one network parameter, and the at least one network parameter comprises a basic service set identifier; identifying at least one access point based on the basic service set identifier; transmitting a request message to at least one of the at least one access point and at least one network entity; receiving at least one of first response message from the at least one access point and a second response message from the at least one network entity, wherein the first response message comprises a first neighbour list having a first target base station within the coverage of the at least one access point, the second response message comprises a second neighbour list having a second target base station within the coverage of the at least one access point, and the first response message and the second response message comprising at least one of a station load and an overlapping quantum of the first target base station and the second target base station; and processing at least one of the first response message and the second response message for performing the handover from the serving base station to a target base station, wherein the target base station is one of the first target base station and the second target base station.

Furthermore, the embodiments of the present disclosure encompass a user equipment for assisting handover in a heterogeneous network, the user equipment comprising a measurement module configured to measure at least one network parameter and generate a handover report, wherein the handover report comprises at least one network parameter, and the at least one network parameter comprises a basic service set identifier; a communication module configured to transmit a handover report to a serving base station, wherein the handover report comprises at least one network parameter, and the at least one network parameter comprises a basic service set identifier, and wherein the serving base station transmits a request message to at least one of the at least one access point and at least one network entity, the serving base station receives a first response message from at least one access point, the first response message comprises a first neighbour list having first target base station within the coverage of the at least one access point, the serving base station receives a second response message from at least one network entity, the second response message comprises a second neighbour list having a second target base station within the coverage of the at least one access point, the first response message and the second response message comprising at least one of a station load and an overlapping quantum of the first target base station and the second target base station, the serving base station processes at least one of the first response message and the second response message for performing the handover from the serving base station to a target base station, and the target base station is one of the first target base station and the second target base station.

Moreover, the embodiments of the present disclosure encompass another method for a method for assisting a handover in a heterogeneous network, the method being performed by a user equipment, the method comprising steps of transmitting a handover report to a serving base station, wherein the handover report comprises at least one network parameter, and the at least one network parameter comprises a basic service set identifier; wherein the serving base station transmits a request message to at least one of the at least one access point and at least one network entity, the serving base station receives a first response message from at least one access point, the first response message comprises a first neighbour list having first target base station within the coverage of the at least one access point, the serving base station receives a second response message from at least one network entity, the second response message comprises a second neighbour list having a second target base station within the coverage of the at least one access point, the first response message and the second response message comprising at least one of a station load and an overlapping quantum of the first target base station and the second target base station, the serving base station processes at least one of the first response message and the second response message for performing the handover from the serving base station to a target base station, and the target base station is one of the first target base station and the second target base station.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to mechanisms for performing a handover event on a UE from an entity such as a serving base station to a target base station in a heterogeneous network. The UE may send a handover related information to the serving base station including at least one network parameter such as a BSSID and at least one of an extended service set identifier (SSID), an extended wireless service set identifier (ESSID) and a signal strength threshold of the service set identifier.

Further, the embodiments of the present disclosure may relate to a system for enabling the serving base station to identify at least one access point and thereby transmitting a request message to at least one of the at least one access point and at least one network entity. Subsequently, the serving base station may be configured to receive a response message from at least one of the at least one access point and the at least one network entity to process the received response message for performing the handover from the serving base station to the target base station.

As used herein, the serving base station (macro base station) and the target base station (micro/pico base station) may comprise of multiple cellular and Wi-Fi small cells, either separate or integrated and may be deployed at various hotspot locations under a macro coverage area.

As used herein, the UE may include, but are not limited to, a mobile phone, a tablet, a phablet, a laptop, a desktop computer, a personal digital assistant (PDA), a set top box and any such device obvious to a person skilled in the art. Further, the UE may comprise an input means such as a keyboard, an operating system, a memory unit, a display interface, etc.

Figure 1:
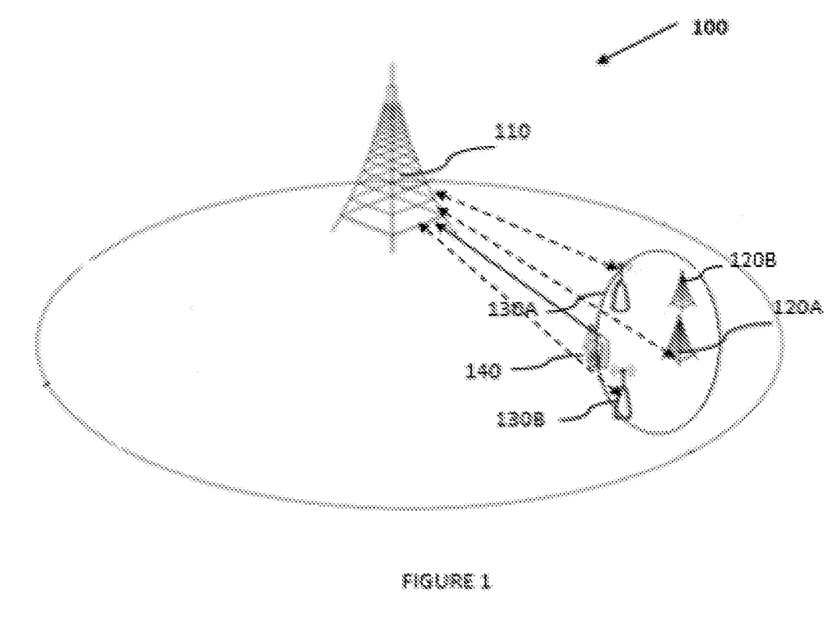
FIG. 1 illustrates system architecture of an exemplary heterogeneous network [100] for performing a handover from a serving base station to a target base station in accordance with an embodiment of the present disclosure.

FIG. 1 illustrates an exemplary embodiment of the present disclosure which encompasses a system for performing the handover from a serving base station to a target base station. The system [100] may comprise a serving base station [110], a UE [140], a first target base station [120A], a second target base station [120B], one or more access points [130A, 130B] connected to the first target base station [120A] and the second target base station [120B]. The system [100] may further comprise at least one network entity such as a server node residing inside a core network. Also, the one or more access points [130A, 130B] and the at least one network entity may be connected to the serving base station [110].

The UE [140] may be configured to trigger a handover request by transmitting a handover report from the serving base station [110] pursuant to the connection between the UE [140] and the serving base station [110]. The handover report may comprise at least one network parameter, wherein the at least one network parameter may comprise a BSSID along with a signal strength threshold of the BSSID and at least one of a SSID, an ESSID and a signal strength threshold of the extended service set identifier. Therefore, in an event the UE [140] moves towards the first target base station [120A], the UE [140] may detect BSSID from the at least one access point [130A, 130B] connected to the first target base station [120A]. Further, in an event the detected value of BSSID is beyond a predetermined threshold, the UE [140] may trigger a handover request by transmitting a handover report to the serving base station [110] for performing a handover from the serving base station [110] to the first target base station [120A], wherein the handover report may be transmitted to the serving base station [110] either periodically or in real-time. Thus, the UE [140] may discontinue transmitting the handover report in an event the BSSID reaches a predetermined threshold.

The serving base station [110] may further identify at least one access point [130A, 130B] based on the BSSID and subsequently may transmit a request message to at least one of the identified at least one access point [130A, 130B] and the at least one network entity requesting for the neighbouring base stations. The serving base station [110] may receive a response message from at least one of the at least one access [130A, 130B] and the at least one network entity. In a preferred embodiment, the serving base station [110] may receive a first response message from the at least one access point [e.g. 130A, 130B], wherein the first response message comprises a neighbour list containing first target base station [120A] within the coverage of the at least one access point [e.g. 130A, 130B] while the serving base station [110] may receive a second response message from the at least one network entity, wherein the second response message comprises a neighbour list containing at least one second target base station [120B] within the coverage of the at least network entity. Further, the first response message and the at least one second message may comprise at least one of a station load and an overlapping quantum of the first target base station [120A] and the second target base station [120B]. In an embodiment, the neighbour list may be maintained at the serving base station [110], as furnished below:

[First target base station [120A]—PCI:102]
[Second target base station [120B]—PCI:102]

On receiving the at least one of the first response message and the at least one second response message, the serving base station [110] may initiate to process the at least one of the first response message and the at least one second response message. In an event, the first response message is received alone from the at least one access point [e.g. 130A], the serving base station [110] may prioritise the first target base station [120A] of the first neighbour list based on the at least one network parameter for generating a first prioritised list. The first prioritised list may then be analysed based on various parameters of the first target base station [120A], such as base station load, quantum of Wi-Fi overlap with the base station and the UE reported reference signal power value of the base station, thereby identifying a suitable target base station. Following may be the first neighbour list maintained by the first target base station [120A] in an embodiment of this present disclosure:

[Access Point 130A—BSSID1, HSSID1, ESSID1]
[Access Point 130B—BSSID2, HSSID2, ESSID2]

In another event, the second response message alone may be received from the at least one network entity, the serving base station [110] may prioritise the at least one second target base station [120B] of the second neighbour list based on the at least one network parameter for generating a second prioritised list. The second prioritised list may then be analysed based on various parameters of the at least one second target base station [120A], such as base station load, quantum of Wi-Fi overlap with the base station and the UE reported reference signal power value of the base station, thereby identifying a suitable target base station.

In an event both the first response message and the second response message are received from the at least one access point [e.g. 130A] and the at least one network entity respectively, the serving base station [110] may prioritise the first target base station [120A] of the first neighbour list and the at least one second target base station [120B] of the second neighbour list in order to generate a first prioritised list and a second prioritised list. Subsequently, the serving base station [110] may combine the first prioritised list and the second prioritised list to compare the lists based on the parameters including, but not limiting to, RSRP of target base station, the target base station load and the UE reported reference signal power value of the target base station. A preferred embodiment relates to ranking of the base station present in the prioritised lists for identifying a preferred neighbour based on overlapping status of the cellular base station with respect to one or more identified Wi-Fi nodes, loading of the base station, and the reported signal strength of UE for one or more identified Wi-Fi nodes. Therefore, the base stations that are present at the top of the combined list may be given priority, thereby identifying a suitable target base station.

Figure 2:
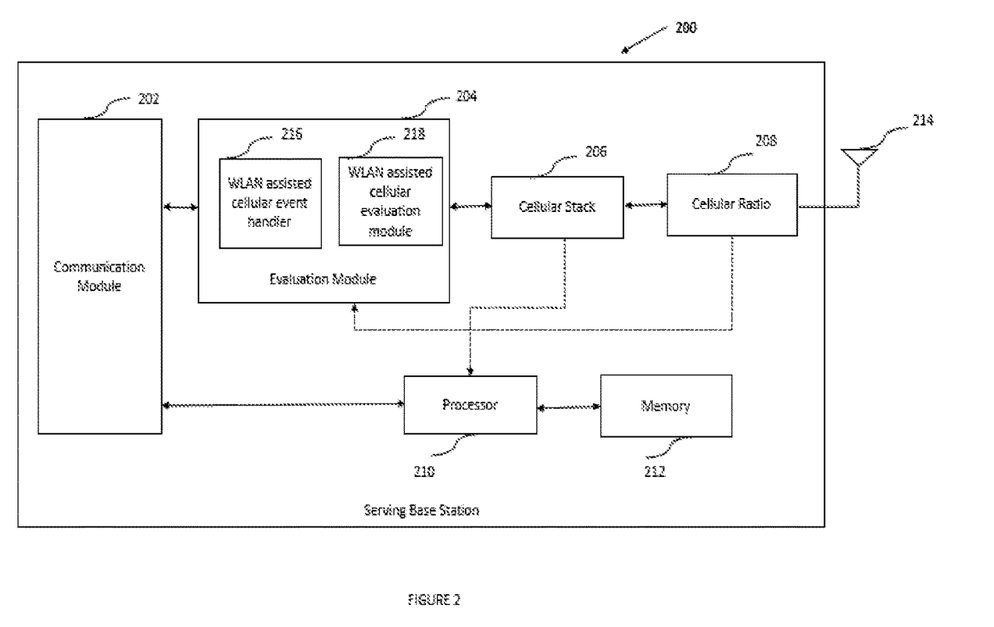
FIG. 2 illustrates an exemplary serving base station system [200] deployed in the heterogeneous network for performing the handover in accordance with an embodiment of the present disclosure.

As illustrated in FIG. 2, the present disclosure encompasses a system architecture [200] for the exemplary serving base station [110], comprising: a communication module [202], an evaluation module [204], a cellular stack [206], a cellular radio [208] connected with an antenna [214], a processor [210], and a memory [212].

The communication module [202] of the serving base station [110] may be configured to receive the handover report comprising at least one network parameter from the UE [140], wherein the at least one network parameter comprises a BSSID along with a signal strength threshold of the BSSID and at least one of a SSID, an ESSID and a signal strength threshold of the extended service set identifier. The handover report may be received from the UE [140] either periodically or in real-time. Thus, the UE [140] may discontinue transmitting the handover report in an event the BSSID reaches/exceeds a predetermined threshold.

The communication module [202] of the serving base station [110] may include a transmission/reception radio frequency (RF) antenna, communicatively coupled to a modulation/demodulation circuit configured to extract information from RF signals received via the RF antenna and provide it to processor [210], or encode information received from processor [210] into RF signals transmitted by the RF antenna. In some embodiments, communication module [202] of the serving base station [110] may be implemented using cellular radio [308] connected to antenna [314]. The communication module [202] of the serving base station [110] may be configured to identify at least one access point [130A, 130B] based on the BSSID. On identifying the at least one access point [e.g. 130A], the communication module [202] may transmit a request message to at least one of the identified at least one access point [130A, 130B] and the network entity. Furthermore, the communication module [202] may be configured to receive the response messages from the first target base station [120A] and the second target base station [120B]. In a preferred embodiment, the serving base station [110] receives a first response message from the at least one access point [e.g. 130A, 130B], wherein the first response message comprises a neighbour list containing first target base station [120A] within the coverage of the at least one access point [130A, 130B] and the serving base station [110] receives a second response message from the at least one network entity, wherein the second response message comprises a neighbour list containing at least one second target base station [120B] within the coverage of the at least one access point [130A, 130B]. Further, the first response message and the at least one second message may comprise at least one of the station load and the overlapping quantum of the first target base station [120A] and the at least one second target base station [120B].

The evaluation module [204] of the serving base station [110] may comprise a wireless local area network (WLAN)

assisted cellular event handler [216] and a WLAN assisted cellular evaluation module [218]. The WLAN assisted cellular event handler [216] may be configured to process the handover report received from the UE [140] while the WLAN assisted cellular evaluation module [218] may be configured to process at least one of the first response received from the at least one access point [130A, 130B] and the second response received from the at least one network entity. In an event, the first response message alone is received from the at least one access point [130A, 130B], the WLAN assisted cellular evaluation module [218] may prioritise the first target base station [120A] of the first neighbour list based on the at least one network parameter for generating a first prioritised list. The first prioritised list may then be analysed based on at least one of a user reported reference signal power value (RSRP), base station load and Wi-Fi overlapping quantum of the first target base station [120A], thereby identifying a suitable target base station. In another event, the second response message alone is received from the at least one network entity, the WLAN assisted cellular evaluation module [218] may prioritise the at least one second target base station [120B] of the second neighbour list based on the at least one network parameter for generating a second prioritised list. The second prioritised list may then be analysed based on at least one of the user reported reference signal power value (RSRP), the base station load and the Wi-Fi overlapping quantum of the at least one second target base station [120B], thereby identifying a suitable target base station. In an event, both the first response message and the second response message are received from the at least one access point [130A, 130B] and the at least one network entity respectively, the WLAN assisted cellular evaluation module [218] may prioritise the first target base station [120A] of the first neighbour list and the at least one second target base station [120B] of the second neighbour list to generate a first prioritised list and a second prioritised list. Subsequently, the serving base station [110] may combine the first prioritised list and the second prioritised list to compare the lists based on at least one of user reported reference signal power value (RSRP), the base station load and the Wi-Fi overlapping quantum of the first target base station [120A] and one second target base station [120B], thereby identifying a suitable target base station.

Further, the evaluation module [204] and the processor [210] may be connected with each other and the processor [210] may be configured to work with the evaluation module [204] so as to process at least one of the prioritised lists, the comparison result and evaluation decision. The processor [210] as used herein may include, but is not limited to, processor or set of processors configured to perform operations, such as, for example, a microprocessor, a multi-core microprocessor, a digital signal processor, a collection of electronic circuits, or a combination thereof.

The cellular radio [208] may be connected to the antenna [214] for receiving and transmitting communication signals and works with the cellular stack [206]. The cellular radio may be selected from a wide range of frequency bands such as 800 MHz, 900 MHz, 1800 MHz, 2100 MHz, 2300 MHz, etc.

The memory [212] may be configured to store and maintain the neighbour list's of the serving base station [110]. The memory [212] may include, but is not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Further, all the components as used herein of the system architecture for the serving base station [110] may share common configuration and specification with the components of the first target base station [120A] and the second target base station [120B].

Figure 3:
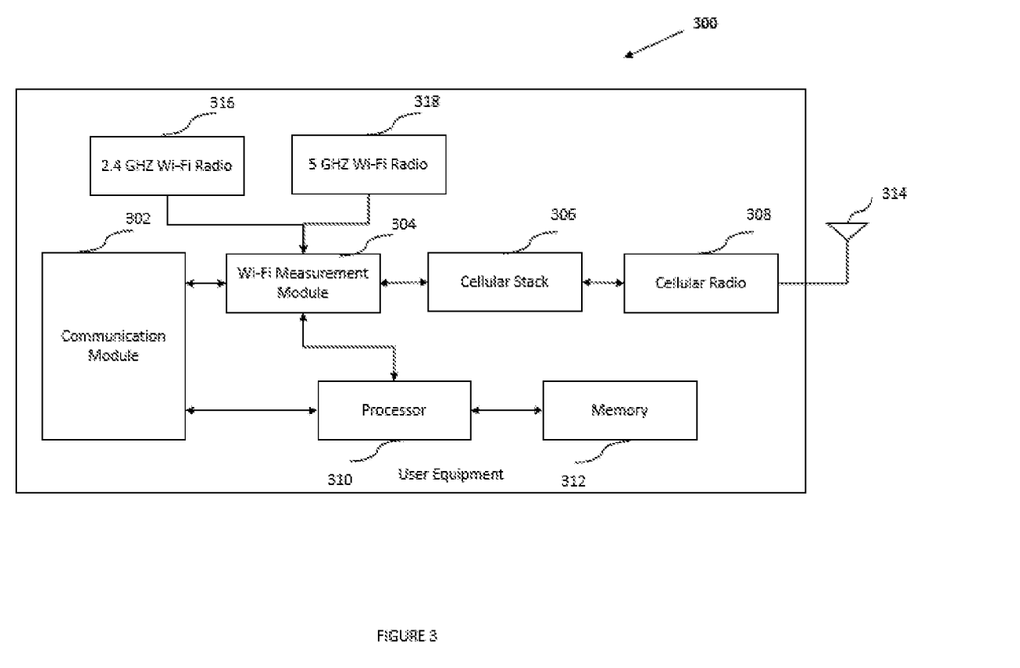
FIG. 3 illustrates an exemplary UE system [300] deployed in the heterogeneous network for performing the handover in accordance with an embodiment of the present disclosure.

As illustrated in FIG. 3, the present disclosure encompasses a system architecture [300] for the exemplary UE [140], comprising a communication module [302], a Wi-Fi measurement module [304], a cellular stack [306], a cellular radio [308] connected with an antenna [314], a processor [310], a memory [312], a 2.4 GHZ Wi-Fi Radio [316] and a 5 GHZ Wi-Fi Radio [318]. The 2.4 GHZ Wi-Fi Radio [316] and the 5 GHZ Wi-Fi Radio [318] of the UE [140] may be configured to provide Wi-Fi capability to the UE [140] on both licensed and unlicensed bands and may be configured to operate in a frequency band of 2.4 GHZ to 5 GHZ, wherein the Wi-Fi radio may be configured to the UE in either static or dynamic manner.

The Wi-Fi measurement module [304] may be configured to measure at least one network parameter from the at least one access point [130A, 130B], wherein the at least one network parameter may comprise a BSSID along with a signal strength threshold of the BSSID and at least one of a SSID, an ESSID and a signal strength threshold of the extended service set identifier. Further, the Wi-Fi measurement module [304] may be configured to compare the detected value of BSSID with a predetermined threshold for taking a decision of sending the handover report. In an event the detected values are beyond the predetermined threshold, the UE [140] may trigger a handover request by transmitting a handover report to the serving base station [110] for performing a handover from the serving base station [110] to the first target base station [120A].

Further, the Wi-Fi measurement module [304] and the processor [310] may be connected with each other and the processor [310] may be configured to work with the Wi-Fi measurement module [304] to process the decision. The processor [310] as used herein may include, but is not limited to, processor or set of processors configured to perform operations, such as, for example, a microprocessor, a multi-core microprocessor, a digital signal processor, a collection of electronic circuits, or a combination thereof.

The communication module [302] of the UE [140] may be configured to trigger a handover request by transmitting the handover report to the serving base station [110], wherein the handover report comprises at least one network parameter from the UE [140]. The handover report may be transmitted to the serving base station [110] either periodically or in real-time. Thus, the UE [140] may discontinue transmitting the handover report in an event the BSSID reaches/exceeds a predetermined threshold. In an exemplary embodiment, the UE [140] may initially prepare handover reports for all the correlating base stations. Subsequently, a particular base station may be selected as a candidate base station for handover among the other base stations based on handover preparation feedback.

Further, the cellular radio [308] may be connected to the antenna [314] for receiving cellular signals from other nearby target base stations. Further, the cellular radio [308] may work with the cellular stack [306].

The memory [312] may be configured to store and maintain the neighbour list of the serving base station. The memory [312] may include, but is not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Figure 4:
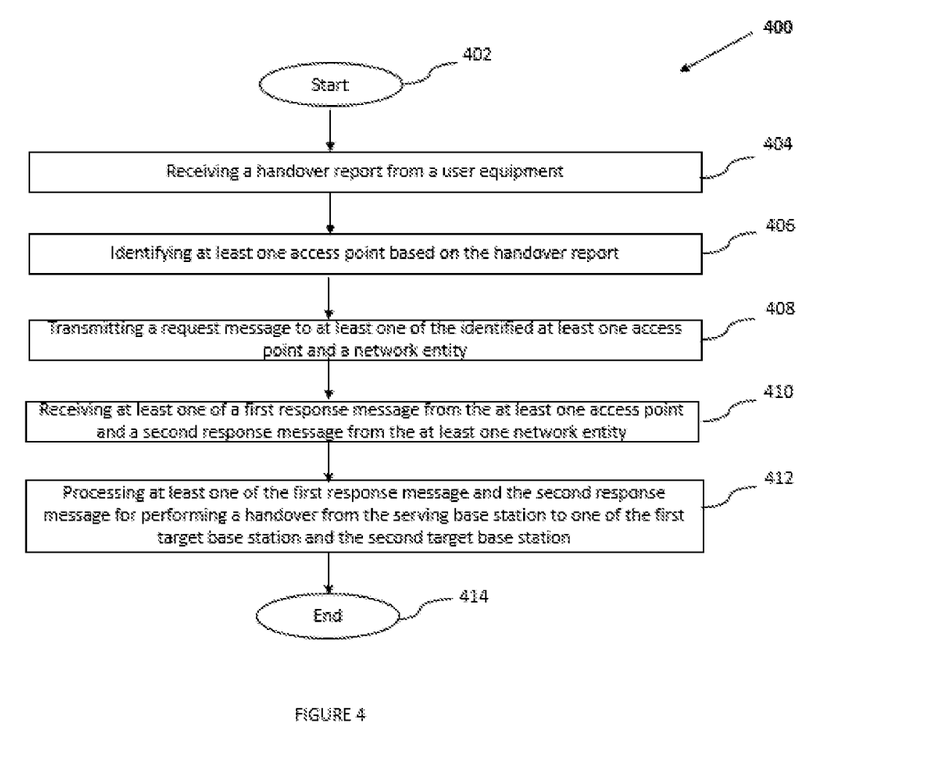
FIG. 4 illustrates an exemplary method flow diagram [400] comprising the method steps being performed by the serving base station [110] for performing the handover in accordance with an embodiment of the present disclosure.

As illustrated in FIG. 4, the present disclosure encompasses an exemplary method [400] for performing a handover between the serving base station [110] to a target base station, wherein the method may be performed at the serving base station [110]. The following includes detailed steps involved in performing the handover, wherein the method step may initiate at step 402.

At step 404, the serving base station [110] may receive the handover request from the UE [140] for performing the handover from the serving base station [110] to the first target base station [120A]. The handover report may comprise at least one network parameter, wherein the at least one network parameter comprises a BSSID and at least one of a SSID, an ESSID and a signal strength threshold of the service set identifier. The handover report may be received from the UE [140] either periodically or in real-time.

At step 406, the serving base station [110] may identify at least one access point [130A, 130B] based on the BSSID.

At step 408, the serving base station [110] may transmit a request message to at least one of the at least one access point [130A, 130B] and at least one network entity.

At step 410, the serving base station [110] may receive at least one of first response message from the at least one access point [130A, 130B] and a second response message from the at least one network entity, wherein the first response message may comprise a first neighbour list having at least one first target base station within the coverage of the at least one access point, the second response message may comprise a second neighbour list having at least one second target base station within the coverage of the at least one access point [130A, 130B]. Further, the first response message and the at least one second message may comprise at least one of the station load and the overlapping quantum of the first target base station [120A] and the at least one second target base station [120B].

At step 412, the serving base station [110] may initiate to process at least one of the first response message and the second response message for performing the handover from the serving base station [110] to a target base station, wherein the target base station is one of the at least one first target base station and the at least one second target base station.

At step 414, the method [400] may terminate with performing the handover of the UE [140] from the serving base station [110] to the target base station, wherein the target base station may be identified either from the first neighbour list or the second neighbour list.

Figure 5:
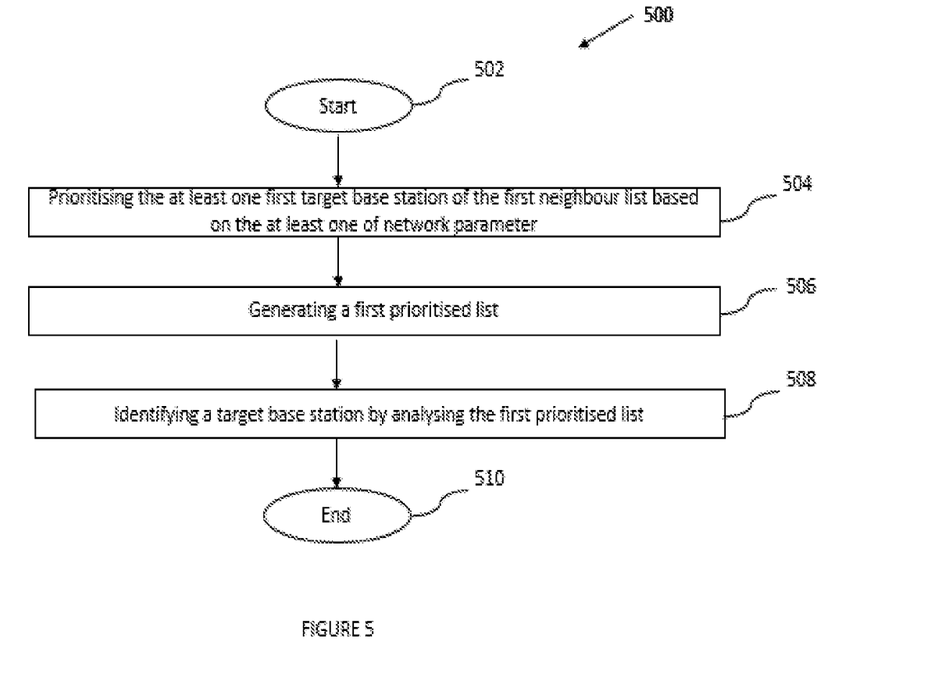
FIG. 5 illustrates an exemplary method flow diagram [500] comprising the method for processing the first response message received from the at least one access point [130A, 130B] for performing the handover in accordance with an embodiment of the present disclosure.

As illustrated in FIG. 5, the present disclosure encompasses an exemplary method [500] for processing the first response message received from the at least one access point [130A, 130B] in order to perform the handover from the serving base station [110] to a target base station, wherein the method may be performed at the serving base station [110]. The following includes detailed steps involved in processing the first response message received by the serving base station [110], wherein the method may initiate at step 502.

At step 504, the serving base station [110] may prioritise the first target base station [120A] of the first neighbour list based on the at least one network parameter.

At step 506, the serving base station [110] may generate a first prioritised list based on the prioritised result.

At step 508, the serving base station [110] may analyse the first prioritised list based on at least one of the user reported reference signal power value (RSRP), the base station load and the Wi-Fi overlapping quantum of the first target base station [120A], thereby identifying a suitable target base station to perform the handover between the serving base station [110] and the identified target base station.

At step 510, the method [500] may terminate with performing the handover of the UE [140] from the serving base station [110] to the identified target base station, wherein the target base station may be identified from the first neighbour list.

Figure 6:
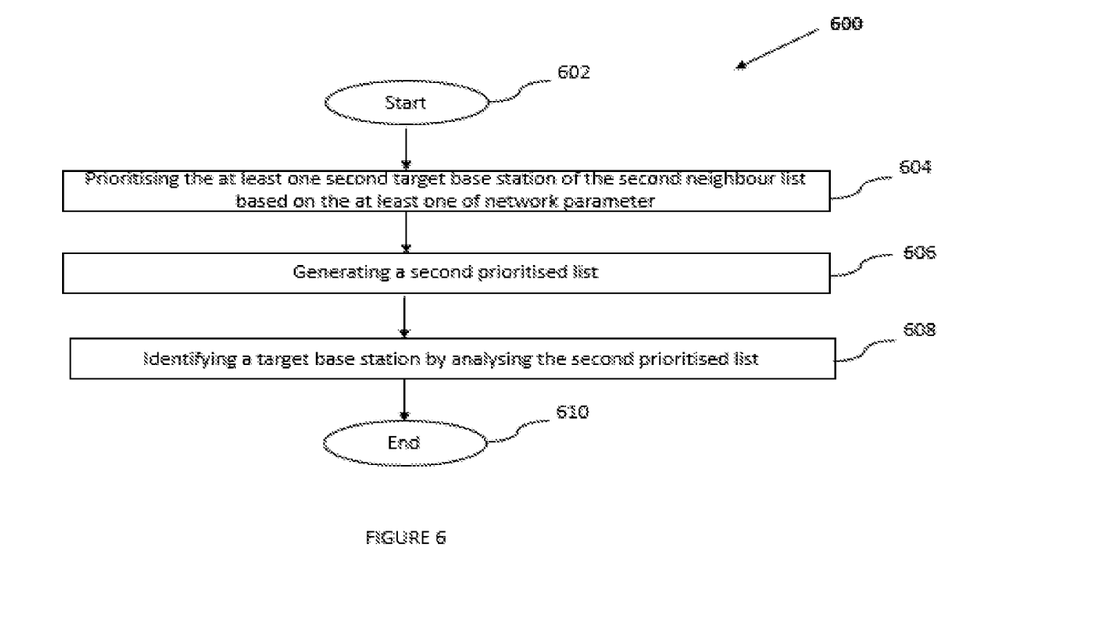
FIG. 6 illustrates an exemplary method flow diagram [600] comprising the method for processing the second response message received from the at network entity for performing the handover in accordance with an embodiment of the present disclosure.

As illustrated in FIG. 6, the present disclosure encompasses an exemplary method [600] for processing the second response message received from the at least one network entity in order to perform the handover from the serving base station [110] to a target base station, wherein the method may be performed at the serving base station [110]. The following includes detailed steps involved in processing the second response message received by the serving base station [110], wherein the method may initiate at step 602.

At step 604, the serving base station [110] may prioritise the at least one second target base station [120A] of the second neighbour list based on the at least one network parameter.

At step 606, the serving base station [110] may generate a second prioritised list based on the prioritised result.

At step 608, the serving base station [110] may analyse the second prioritised based on at least one of the user reported reference signal power value (RSRP), the base station load and the Wi-Fi overlapping quantum of the at least one second target base station [120B], thereby identifying a suitable target base station to perform the handover between the serving base station [110] and the identified target base station.

At step 610, the method [600] may terminate with performing the handover of the UE [140] from the serving base station [110] to the identified target base station, wherein the target base station may be identified from the second neighbour list.

Figure 7:
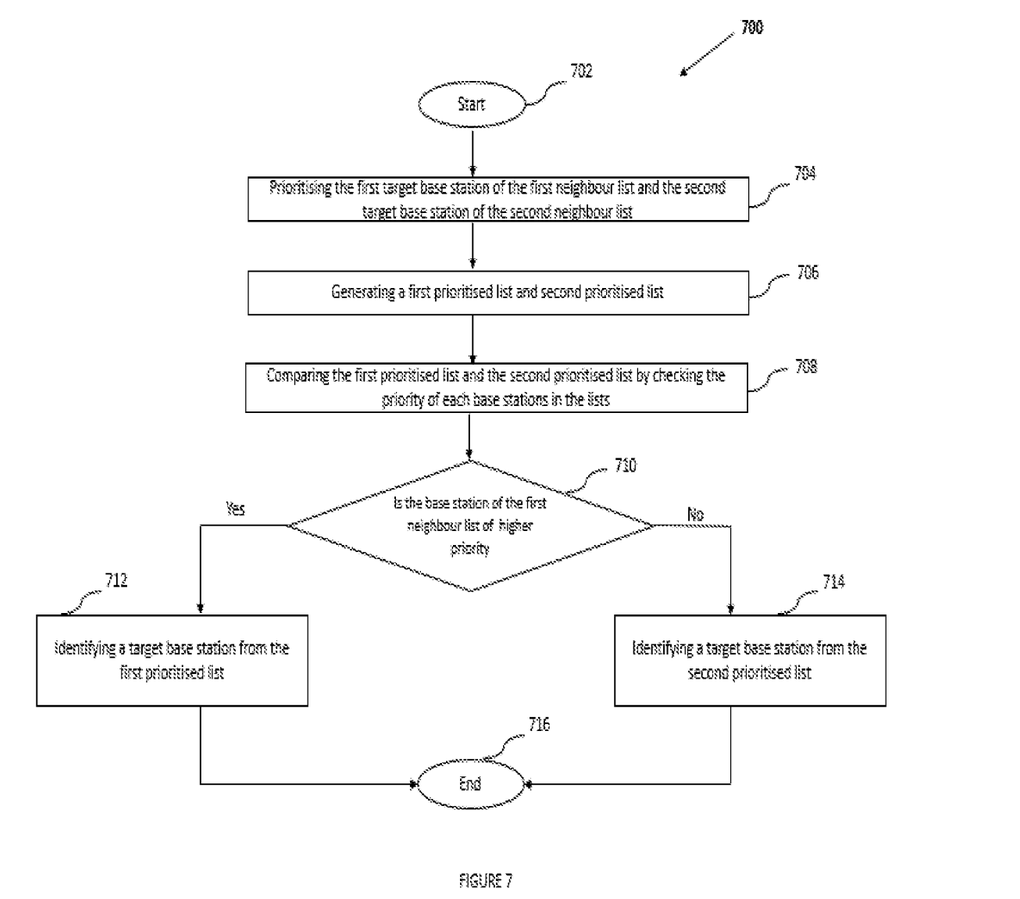
FIG. 7 illustrates an exemplary method flow diagram [700] comprising the method [700] for processing the first response message received from the at least one access point [130A, 130B] and the second response message received from the at least one network entity for performing the handover in accordance with an embodiment of the present disclosure.

As illustrated in FIG. 7, the present disclosure encompasses an exemplary method [700] for processing the first response message received from the at least one access point [130A, 130B] and the second response message received from the at least one network entity in order to perform the handover from the serving base station [110] to a target base station, wherein the method may be performed at the serving base station [110]. The following includes detailed steps involved in processing the first response message and the second response message received by the serving base station [110], the method may initiate at step 702.

At step 704, serving base station [110] may prioritise the first target base station of the first neighbour list and the second target base station of the second neighbour list.

At step 706, the serving base station [110] may generate a first prioritised list and a second prioritised list based on the prioritised result.

At step 708, the serving base station [110] may combine the first prioritised list and the second prioritised list in order to compare the prioritised lists based on at least one of the user reported reference signal power value (RSRP), the base station load and the Wi-Fi overlapping quantum of the first target base station [120A] and at least one second target base station [120B].

At step 710, the serving base station [110] may analyse the compared result and determine if the base station of the first neighbour list is of higher priority. If the base station of the first neighbour list is of higher priority, then the method [700] may proceed to step 712 or else the method [700] may proceed to step 714. A preferred embodiment relates to ranking of the base station present in the prioritised lists for identifying a preferred neighbour based on overlapping status of the cellular base station with respect to one or more identified Wi-Fi nodes, loading of the base station, and the reported signal strength of UE for one or more identified Wi-Fi nodes. Therefore, the base stations that are present at the top of the combined list may be given higher priority, thereby identifying a suitable target base station.

At step 712, the serving base station [110] may identify a suitable target base station from the first neighbour list to perform the handover between the serving base station [110] and the identified target base station.

At step 714, the serving base station [110] may identify a suitable target base station from the second neighbour list to perform the handover between the serving base station [110] and the identified target base station.

At step 716, the method [700] may terminate with performing the handover of the UE [140] from the serving base station [110] to the identified target base station, wherein the target base station is identified either from the first neighbour list or second neighbour list.

Figure 8:
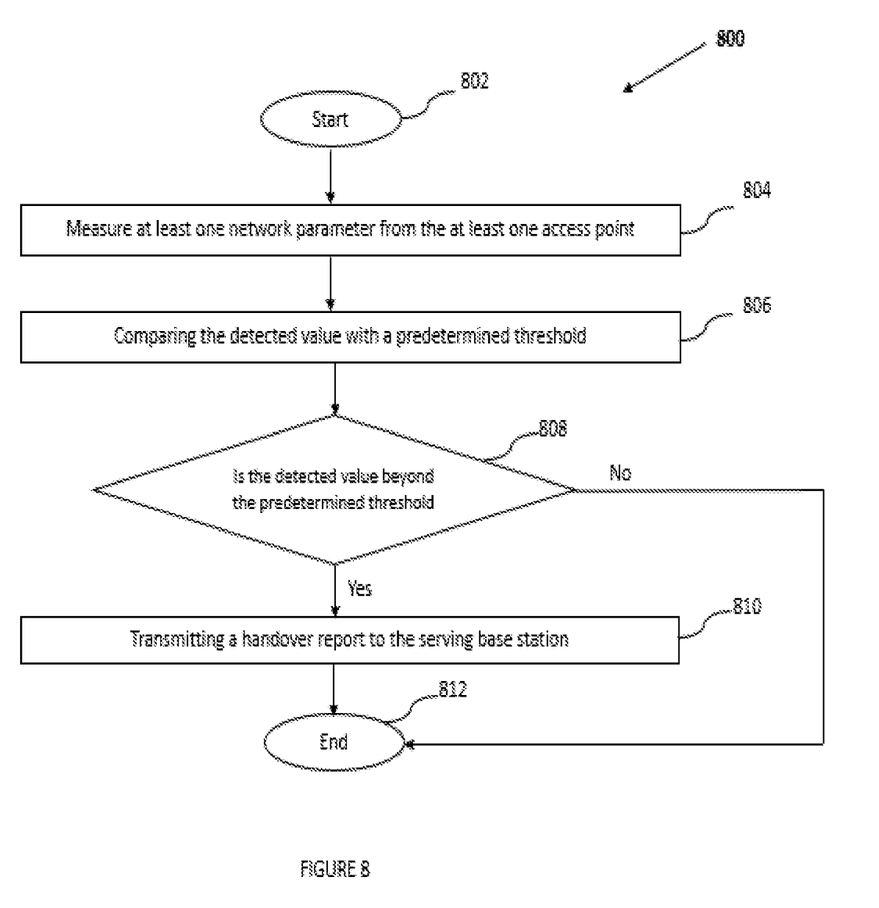
FIG. 8 illustrates an exemplary method flow diagram [800] comprising the method steps being performed by the UE [140] for performing the handover from the serving base station to the target base station in accordance with an embodiment of the present disclosure.

As illustrated in FIG. 8, the present disclosure encompasses an exemplary method [800] for performing a handover between the serving base station [110] to a target base station, wherein the method is being performed at the UE [140]. The following includes detailed steps involved in performing the handover, wherein the method step may initiate at step 802.

At step 804, the UE [140] may measure the at least one network parameter from the at least one access point [130A, 130B], wherein the at least one network parameter comprises a BSSID along with a signal strength threshold of the BSSID and at least one of aSSID, an eESSID and a signal strength threshold of the extended service set identifier.

At step 806, the UE [140] may compare the detected value of BSSID with a predetermined threshold for taking a decision of sending the handover report.

At step 808, the UE [140] may analyse the detected value and determine if the detected value is beyond the predetermined threshold. In an event the detected values are beyond the predetermined threshold, the method [800] may proceed to step 810, or else the method may lead to step 812 and may terminate.

At step 810, the UE [140] may trigger a handover request by transmitting a handover report to the serving base station [110], wherein the handover report may comprise the at least one network parameter. The handover report may be transmitted to the serving base station [110] either periodically or in real-time.

At step 812, the method [800] may terminate with performing the handover of the UE [140] from the serving base station [110] to the identified target base station, wherein the target base station may be identified either from the first neighbour list or second neighbour list.

Figure 9:
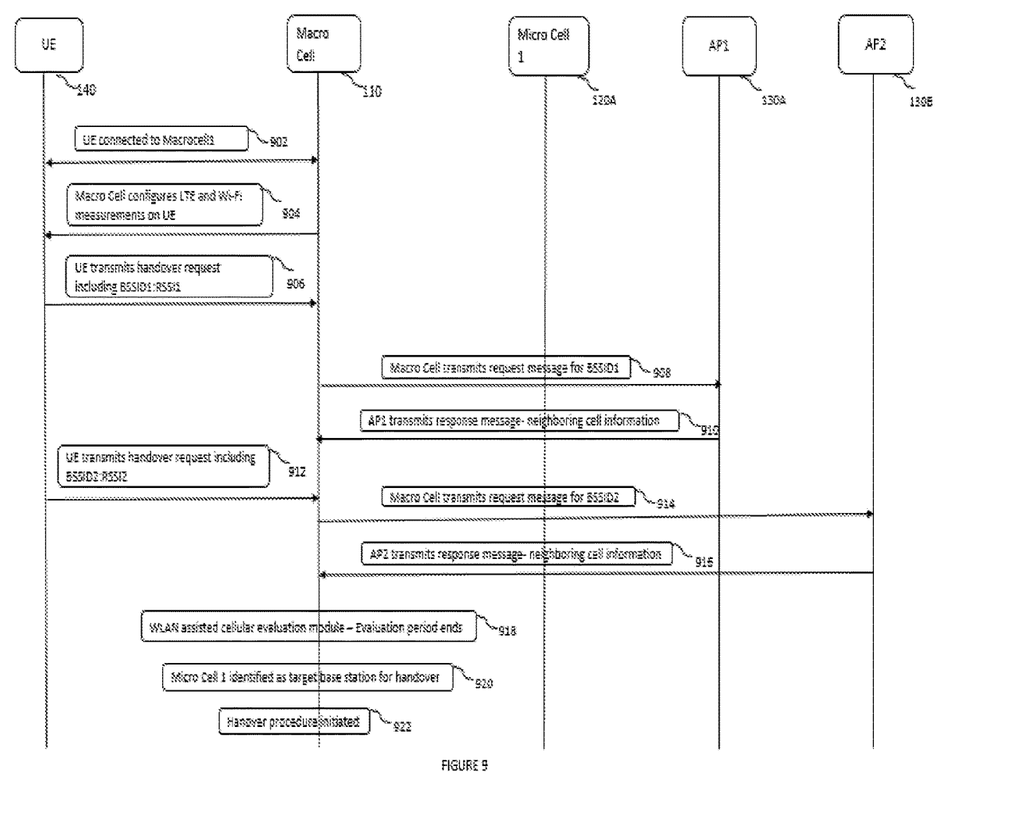
FIG. 9 illustrates an exemplary signaling flow diagram [900] for performing a handover between the serving base station [110] and the target base station in accordance with an embodiment of the present disclosure.

FIG. 9 illustrates an exemplary embodiment of the present disclosure that encompasses a method [900] flow signalling diagram for performing a handover between the serving base station (macro cell) [110] to a target base station (micro cell) [e.g. 120A]. The following steps describe the implementation architecture details of the performing the handover:

At step 902, the UE [140] may connect to the serving base station [110].

At step 904 and pursuant to accomplishment of step 902, the serving base station [110] may configure the cellular and Wi-Fi measurement capabilities and requirements on the UE [140].

At step 906, the UE [140] may trigger a handover request by transmitting the handover report including BSSID1: RSSI1. The handover report may be transmitted to the serving base station either periodically or in real-time.

At step 908, the serving base station [110] may identify the access point [e.g. 130A] corresponding to BSSID1: RSSI1 and may transmit a request message to the access point [e.g. 130A] to get the related cellular information.

At step 910, the access point [e.g. 130A] may transmit the response message including information related to cellular base station present in the vicinity of the access point [e.g. 130A].

At step 912, the UE [140] may trigger another handover request by transmitting the handover report including BSSID2:RSSI2. The handover report may be transmitted to the serving base station [110] either periodically or in real-time.

At step 914, the serving base station [110] may identify the access point [e.g. 130B] corresponding to BSSID2: RSSI2 and may send a request message to the access point [e.g. 130B] to get the related cellular information.

At step 916, the access point [e.g. 130B] may transmit the response message including information related to cellular base station present in the vicinity of the at least one access point [e.g. 130B].

At step 918, 920 and 922 and pursuant to the completion of the evaluation period, the micro cell 1 [120A] may be identified as the target base station suitable for handover.

Although, the present disclosure has been described with respect to the example cited above where the UE [140] approaches and detects signals and network parameters from the access point [130A, 130B] which is connected to the first target base station [120A], however, it will be appreciated by those skilled in the art that the present disclosure is also applicable in scenarios when the UE [140] approaches and detects signals and other network parameters from any access point [130A, 130B] which are connected any target base stations available nearby such as the first target base station [120A] and the second target base station [120B].

Though a limited number of the first target base station [120A], the second target base station [120B], the UE [140], the access points [130A, 130B] and the link/connection/ interfaces, have been shown in the figures; however, it will be appreciated by those skilled in the art that the system [100] of the present disclosure encompasses any number and varied types of the entities/elements such as the interfaces, the UE [140], the access points [130A, 130B], the first target base station [120A], and the second target base station [120B].

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

The invention claimed is:

1. A method for performing a handover in a heterogeneous network, the method being performed by a serving base station, the method comprising:
    receiving a handover report from at least one user equipment, wherein the handover report comprises at least one network parameter, and the at least one network parameter comprises a basic service set identifier;

identifying at least one access point based on the basic service set identifier;

transmitting a request message to at least one of the at least one access point and at least one network entity;

receiving at least one of a first response message from the at least one access point and a second response message from the at least one network entity, wherein
 the first response message comprises a first neighbour list including a first target base station within coverage of the at least one access point,
 the second response message comprises a second neighbour list including a second target base station within coverage of the at least one access point, and
 the first response message and the second response message comprising at least one of a station load and a Wi-Fi overlapping quantum of the first target base station and the second target base station; and processing at least one of the first response message and the second response message for performing the handover from the serving base station to a target base station, wherein the target base station is one of the first target base station and the second target base station.

2. The method as claimed in claim 1, wherein the at least one network parameter further comprises at least one of an extended service set identifier and a signal strength threshold of the extended service set identifier.

3. The method as claimed in claim 1, wherein the handover report is received from the at least one user equipment in one of periodically and real-time.

4. The method as claimed in claim 3, wherein the receiving of the handover report is discontinued after the signal strength of the basic service set identifier exceeds a predefined signal strength threshold.

5. The method as claimed in claim 1, wherein the at least one access point and the at least one network entity are connected to the serving base station.

6. The method as claimed in claim 1, wherein the processing the first response message comprises:
 prioritising the first target base station of the first neighbour list, based on the at least one network parameter, to generate a first prioritised list, and
 identifying a target base station by analysing the first prioritised list based on at least one of a user reported reference signal power value (RSRP), a base station load and a Wi-Fi overlapping quantum of the first target base station.

7. The method as claimed in claim 1, wherein the processing the second response message comprises:
 prioritising the second target base station of the second neighbour list, based on the at least one network parameter, to generate a second prioritised list, and
 identifying a target base station by analysing the second prioritised list based on at least one of a user reported reference signal power value (RSRP), a base station load and a Wi-Fi overlapping quantum of the second target base station.

8. The method as claimed in claim 1, wherein processing the first response message and the second response message comprises:
 prioritising the first target base station of the first neighbour list to generate a first prioritised list and the second target base station of the second neighbour to generate a second prioritised list, and
 identifying a target base station by analysing the first prioritised list and the second prioritised list based on a comparison of the first prioritised list and the second prioritised list, wherein the comparison is based on at least one of a user reported reference signal power value (RSRP), a base station load and a Wi-Fi overlapping quantum of the first target base station and the second target base station.

9. A serving base station system for performing a handover in a heterogeneous network, the serving base station comprising:
 a communication module configured to:
  receive a handover report from at least one user equipment, wherein the handover report comprises at least one network parameter, and the at least one network parameter comprises a basic service set identifier;
  identify at least one access point based on the basic service set identifier;
  transmit a request message to at least one of the at least one access point and the at least one network entity;
  receive at least one of a first response message from the at least one access point and a second response message from the at least one network entity, wherein
   the first response message comprises a first neighbour list including a first target base station within coverage of the at least one access point,
   the second response message comprises a second neighbour list including a second target base station within coverage of the at least one access point, and
   the first response message and the second response message comprising at least one of a station load and a Wi-Fi overlapping quantum of the first target base station and the second target base station; and
 an evaluation module configured to process at least one of the first response message and the second response message for performing the handover from the serving base station to a target base station, wherein the target base station is one of the first target base station and the second target base station.

10. A method for assisting a handover in a heterogeneous network, the method being performed by a user equipment, the method comprising:
 transmitting a handover report to a serving base station, wherein
  the handover report comprises at least one network parameter, and
  the at least one network parameter comprises a basic service set identifier;
 wherein
  the serving base station transmits a request message to at least one of the at least one access point and at least one network entity,
  the serving base station receives a first response message from the at least one access point,
  the first response message comprises a first neighbour list including a first target base station within coverage of the at least one access point,
  the serving base station receives a second response message from the at least one network entity,
  the second response message comprises a second neighbour list including a second target base station within coverage of the at least one access point,
  the first response message and the second response message comprise at least one of a station load and a Wi-Fi overlapping quantum of the first target base station and the second target base station, the serving base station processes at least one of the first response message and the second response message for performing the handover from the serving base station to a target base station, and the target base station is one of the first target base station and the second target base station.

11. The method as claimed in claim 10, wherein the at least one access point and the at least one network entity are connected to the serving base station.

12. The method as claimed in claim 10, wherein the at least one network parameter further comprises at least one of an extended service set identifier and a signal strength threshold of the extended service set identifier.

13. The method as claimed in claim 10, wherein the user equipment transmits the handover report to the serving base station in one of periodically and real-time.

14. The method as claimed in claim 13, wherein transmitting the handover report is discontinued after the signal strength of the basic service set identifier exceeds a predefined signal strength threshold.

15. A non-transitory computer-readable medium storing instructions executable by a processor to perform the method of claim 10.

16. A communications system for assisting handover in a heterogeneous network, the communications system comprising:

a user equipment, the user equipment comprising:
  a measurement module configured to measure at least one network parameter and generate a handover report, wherein
    the handover report comprises at least one network parameter, and
    the at least one network parameter comprises a basic service set identifier;
  a communication module configured to:
    transmit a handover report to a serving base station, wherein: the handover report comprises the at least one network parameter, and
    the at least one network parameter comprises the basic service set identifier, and the serving base station, the serving base station configured to:

transmit a request message to at least one of the at least one access point and at least one network entity, receive a first response message from the at least one access point, the first response message comprising a first neighbour list including a first target base station within coverage of the at least one access point, receive a second response message from the least one network entity, the second response message comprising a second neighbour list including a second target base station within coverage of the at least one access point, the first response message and the second response message further comprise at least one of a station load and a Wi-Fi overlapping quantum of the first target base station and the second target base station, process at least one of the first response message and the second response message for performing handover from the serving base station to a target base station, and the target base station being one of the first target base station and the second target base station.

* * * * *